United States Patent [19]

Rarity et al.

[11] Patent Number: 5,418,905
[45] Date of Patent: May 23, 1995

[54] CORRELATED PHOTON PAIR OPTICAL COMMUNICATIONS SYSTEM

[75] Inventors: John G. Rarity; Paul R. Tapster, both of Malvern, United Kingdom

[73] Assignee: The Secretary of State for Defence in Her Britannic Majesty's Government of the United Kingdom of Great Britain and Northern Ireland, London, United Kingdom

[21] Appl. No.: 975,542

[22] PCT Filed: Aug. 8, 1991

[86] PCT No.: PCT/GB91/01352
§ 371 Date: Feb. 18, 1993
§ 102(e) Date: Feb. 18, 1993

[87] PCT Pub. No.: WO92/04785
PCT Pub. Date: Mar. 19, 1992

[30] Foreign Application Priority Data
Aug. 31, 1990 [GB] United Kingdom ............ 90 18 973.9

[51] Int. Cl.⁶ ............................................. H04B 10/00
[52] U.S. Cl. ..................................... 359/158; 359/161; 359/173; 359/189
[58] Field of Search ............... 359/158, 161, 173, 180, 359/188, 189, 195

[56] References Cited

U.S. PATENT DOCUMENTS 4,533,247  8/1985  Epworth ............................ 356/345

FOREIGN PATENT DOCUMENTS

3232429A1  3/1993  Germany.
2094593  9/1982  United Kingdom.

OTHER PUBLICATIONS

Applied Optics, vol. 24, No. 22, 15 Nov. 1985, pp. 3877–3882.
Optical Communications Based on Coincident Photon Pairs, Hong et al., cited in the application, see p. 3877.
Secure Communication System Using Short Coherence Length Sources, Yao et al.

Primary Examiner—Leslie Pascal
Attorney, Agent, or Firm—Nixon & Vanderhye

[57] ABSTRACT

An optical communications system (10) comprises a transmitter (12) and a receiver (14). A source (16) of correlated pairs of photons of conjugate energies provides first and second photon beams (38, 36). The first photon beam (38) passes through a modulated filter (50) to which a communications signal (52) is applied. A variable spectrum beam (54) is produced which is converted to a timing signal (68) of macroscopic optical pulses (66). The second photon beam (36) and timing signal (68) are transmitted to the receiver (14). The received timing signal (84) is converted to a series of electrical timing pulses (90). The received second photon beam (82) passes through an unmodulated filter (94) matched to the modulated filter (50) when the signal (52) is not applied. The unmodulated filter splits the beam (82) into two conjugate spectra photon beams (96, 98) which are then converted to first and second series of electrical pulses (108, 110) respectively. The pulses (90, 108, 110) enter a coincidence counter (92) which records coincidences between the timing pulses (90) and the first series of pulses (108) and between the timing pulses (90) and the second series of pulses (110). Two coincidence rates are obtained and subtraction of one from the other yields an output communications signal (112).

27 Claims, 6 Drawing Sheets

CORRELATED PHOTON PAIR OPTICAL COMMUNICATIONS SYSTEM

BACKGROUND OF THE INVENTION

1 Field of the Invention

The invention relates to an optical communications system, and more particularly to a system in which signals are transmitted in the form of coincidences between optical beams.

2. Discussion of Prior Art

Optical communications systems based on coincident photon pairs have been described previously, for instance by Hong, Friberg and Mandel in Applied Optics Vol. 24, No 22, Pages 3877–3882. The system they describe employs a non-linear crystal to produce simultaneous photon pairs by non-degenerate parametric downconversion of an input pump beam. These photon pairs form two beams of correlated photons, each beam including one photon of each pair. The beams are transmitted separately and in a receiver are detected separately. When a correlated photon pair is detected, one in each beam, a coincidence is recorded. A digital signal is transmitted by direct modulation of the input pump beam, that is by switching it on and off. The off periods in both beams are filled in using light which is spectrally similar to the downconverted photon pairs. The fill-in light is not, however, correlated, and therefore when it is detected in the receiver significant numbers of coincidences are not recorded. Thus periods of coincidences in the receiver correspond to binary one digits and periods of no coincidences (above noise) correspond to binary zero digits.

The system described has the advantage that the use of coincident detection allows discrimination against background noise to be achieved. Communication may therefore be achieved with relatively few photons and where the signal photons would otherwise be lost in the noise in each of the two beams.

The system is also relatively secure from interception due to the fill-in light. If only one beam is intercepted, and the light used to fill in is sufficiently well matched to the signal photons, then the signal cannot be decoded. However, matching the spectrum, intensity and statistical properties of the downconverted photons is difficult in practice. Consequently, detailed analysis of the properties of one beam would, in many cases enable the signal to be decoded. In addition, if both beams are intercepted the signal may be decoded by simple coincidence counting. The system is not therefore very secure.

A similar system employing time modulation in place of direct modulation has also been described. This time modulation system has two pulsed correlated photon beams. A digital signal is transmitted by time modulation of one of the two correlated beams. That is a variable delay is introduced into one of the pulsed beams. As with the direct modulation system described above, if one of the two beams is intercepted the signal cannot be decoded simply. However, careful analysis of statistics of time delays between pulses would enable some modulation to be detected. If the delays used are short compared to the period between pulses of the unmodulated beam, then the modulation detected by such analysis would be minimal. If both beams are intercepted, then as for the direct modulation system, simple coincidence counting will decode the signal. This system also, therefore, is not very secure.

Both of the prior art systems described above also suffer from the severe disadvantage of quadratic reduction in signal to noise as a function of loss in both channels. This puts very real constraints on the practical applications of the systems, particularly limiting the distances over which they may be used.

SUMMARY OF THE INVENTION

It is an object of the present invention to provide an improved optical communications system.

The present invention provides an optical communications system comprising:
 transmitter including a source of correlated pairs of photons with conjugate energies in first and second photon beam channels respectively, and
 a receiver including:
  (i) coincidence counting means arranged to count coincidences between received photons, and
  (ii) discriminating means responsive to variation in coincidence counting rate and arranged to provide a communications signal,
 characterised in that:
 the transmitter includes:
  (a) transmitter filtering means in the first photon beam channel having modulatable spectral dispersion characteristics responsive to a signal input, and
  (b) means responsive to the transmitter filtering means output for transmitting a timing signal, and the receiver includes receiver filtering means having spectral dispersion characteristics conjugate to those of the transmitter filtering means in the absence of signal input and arranged to separate received photons into differing receiver channels on the basis of their spectral characteristics.

The invention provides the advantage that even if both the timing signal and photons from the second transmitter photon beam channel are intercepted during transmission the signal cannot be decoded. The invention therefore offers greater security of communication than in the prior art.

The invention also provides the advantage that communication may be achieved in relatively high levels of background light, for instance when the received signal intensity is two orders of magnitude less than the received background light intensity. This enables the invention to be used in unfavourable conditions. Alternatively the signal beam may be disguised, to enhance security, by mixing in spurious light thus making it more difficult to identify the signal beam.

An additional advantage of the invention over prior art coincidence counting systems is improved signal/noise characteristics. The invention suffers only linear reduction in signal/noise ratio as a function of of signal whilst prior art systems suffer quadratic reduction.

In one embodiment, the receiver filtering means has two filter channels with spectrally conjugate filter characteristics. The receiver filtering means therefore provides two photon beams with conjugate spectra. The coincidence counting means is arranged to count coincidences between the timing signal and the two conjugate spectrum beams separately. Thus two coincidence rates are obtained and one is subtracted from the other in order to obtain the communications signal. Although the use of two filter channels does not add any new information, it increases the signal/noise ratio, and is thus advantageous.

Such an embodiment may be arranged for the transmission of a digital communications signal. In this case the transmitter filtering means is switched between two conjugate spectral dispersion characteristics in response to the digital signal.

Such an embodiment may be provided with transmitter and receiver filtering means in the form of respective Mach Zehnder interferometers. The transmitter filtering means may include an electro-optic modulator in one interferometer arm to which the communications signal is applied. The receiver filtering means Mach Zehnder interferometer is matched to that in the transmitter, ie the filtering means have equivalent optical path lengths when the electro-optic modulator is inactive.

The invention may be arranged for the communication of information at the rate of one bit per photon pair. In such an embodiment modulation of the transmitter filtering means is arranged to produce substantially one hundred per cent modulation of the two coincidence rates measured by the coincidence counter. This embodiment may include a transmitter filtering means with modulatable spectral dispersion characteristics. The transmitter and receiver filtering means may each be arranged for modulation between at least three respective predetermined phase differences in response to respective input signals. At least one of these combinations of phase differences is such as to provide substantially are one hundred per cent modulation of the two measured coincidence rates. In such an embodiment the transmitter and receiver filtering means may each be Mach Zehnder interferometers with an electro-optic modulation in one arm.

The invention may be arranged such that the timing signal and second photon beam are combined for transmission as a single beam. They may be separated in the receiver by means of a polarising beam splitter or dichroic beam splitter as appropriate.

The invention may also be arranged such that the timing signal and second photon beam are transmitted to the receiver through free space. Alternatively, they may be transmitted to the receiver via a fibre optic.

The invention may be provided with a source of correlated photon pairs comprising a pump laser, a non-linear crystal and two apertures. Alternatively, the source of correlated photon pairs may be a cascade atomic source.

BRIEF DESCRIPTION OF THE DRAWINGS

Embodiments of the invention will now be described, by way of example only, with reference to the accompanying drawings in which.

DETAILED DISCUSSIONS OF PREFERRED EMBODIMENTS

Figure 1:
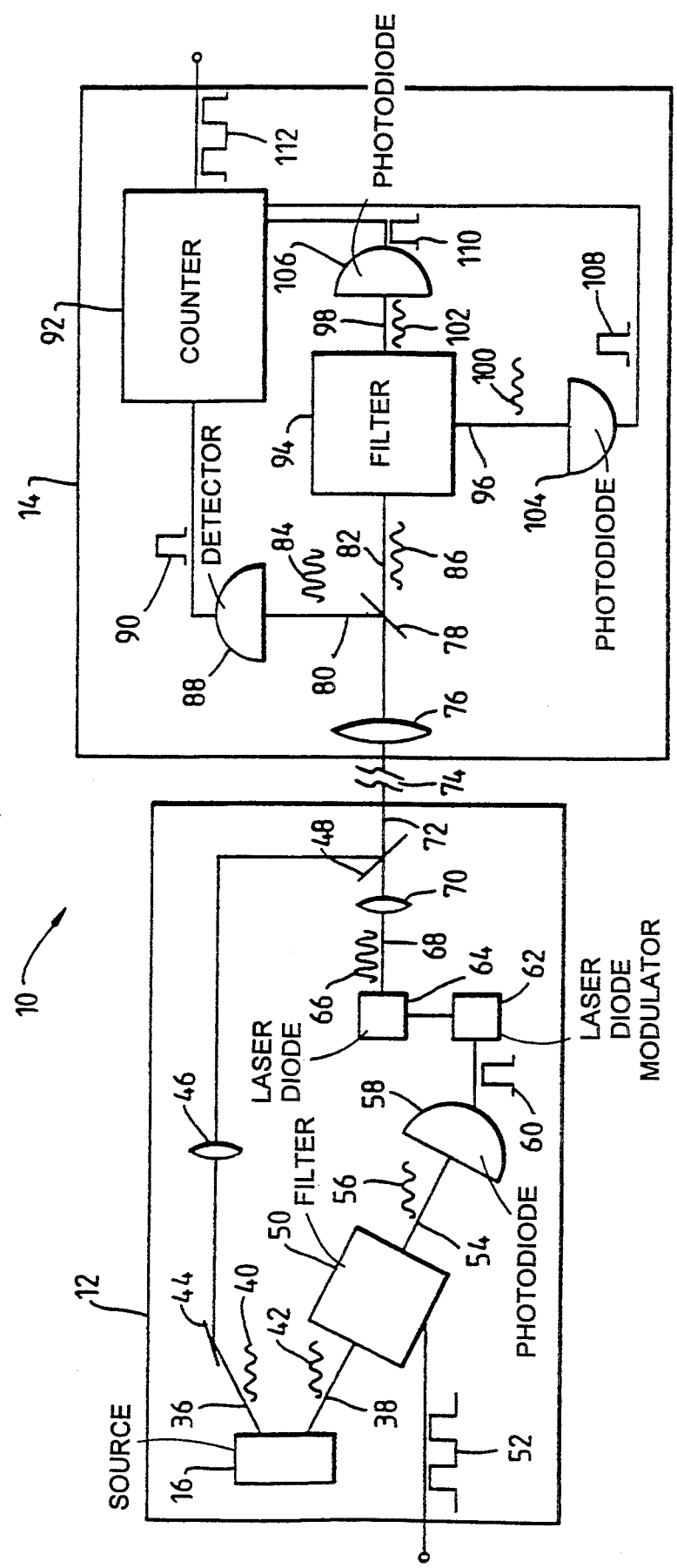
FIG. 1 schematically illustrates an optical communications system of the invention.

Referring to FIG. 1, an optical communications system 10 of the invention is illustrated schematically. The system 10 has two main parts, a transmitter 12 and a receiver 14.

Figure 2:
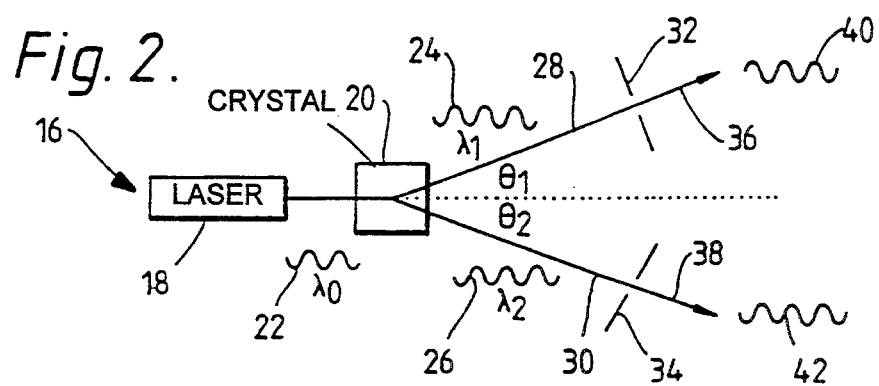
FIG. 2 schematically illustrates a source of correlated photon pairs used in the FIG. 1 system.

Referring now also to FIG. 2, a source 16 of correlated pairs of photons with conjugate energies for use in the transmitter 12 is illustrated schematically. The source 16 consists of a short wavelength laser 18, a non-linear crystal 20 and two apertures 32, 34. In this embodiment the laser 18 is a 100 mW krypton ion laser with a wavelength $\lambda_o = 413.4$ nm and the crystal 20 is lithium iodate. The laser 18 emits photons 22 of wavelength $\lambda_o$ which are incident on the crystal 20. In the crystal 20 the photons 22 undergo non-degenerate downconversion as described by Burnham and Weinburg in Physical Review Letters 25 (1970) page 84, and by Mollow in Physics Review A8 (1973) page 2684. Each photon 22 produces first and second downconverted photons 24, 26 with wavelengths $\lambda_1$ and $\lambda_2$ respectively, at angles $\theta_1$ and $\theta_2$ respectively to the input photon direction.

The downconverted photons 24, 26 are a correlated pair. They are emitted substantially simulataneously and have conjugate energies; that is their energies must sum to the energy of the photon 22. Thus if the energy of the first photon 24 of a pair is known, that of the second photon 26 is also known, and vice versa. This follows from the conservation of energy and momentum which is observed when the photon pair 24, 26 is produced. The following relationships apply:

$$\omega_o = \omega_1 + \omega_2 \tag{1}$$

$$\frac{2\pi}{\lambda_o} = \frac{2\pi}{\lambda_1} \cos\theta_1 + \frac{2\pi}{\lambda_2} \cos\theta_2 \tag{2}$$

$$0 = \frac{2\pi}{\lambda_1} \sin\theta_1 + \frac{2\pi}{\lambda_2} \sin\theta_2 \tag{3}$$

where $\omega_o$, $\omega_1$ and $\omega_2$ are the angular frequencies of the photons 22, 24, 26 respectively. There are many solutions to equations 1 to 3 and therefore many possible angles $\theta_1$, $\theta_2$ for the downconverted photons 24, 26.

The downconverted photons 24, 26 form first and second mixed energy dispersed beams 28, 30. The two apertures 32, 34 select first and second beams 36, 38 of conjugate photons 40, 42; that is they select pairs of photons 40, 42 which correspond to one solution of equations 1 to 3.

The apertures 32, 34 have equal finite widths giving the photons 40, 42 like frequency bandwidths of $2\delta\omega$. The aperture 32 selects photons 40 with an angular frequency $\omega_1 \pm \delta\omega$ and the aperture 34 selects photons 42 with an angular frequency $\omega_2 \pm \delta\omega$. In this embodiment the symmetrical solution of $\omega_1 = \omega_2 = \omega_o/2$ has been implemented by appropriate aperture positioning. The apertures 32, 34 accept photons 40, 42 at an angle of $\theta_1 = \theta_2 = 14.5°$ corresponding to $\lambda_1 = \lambda_2 = 826.8$ nm with a bandwidth of 5 nm.

The two beams 36, 38 have a low light level. The first beam 36 passes via a mirror 44 and a lens 46 to a polarising beam splitter 48. The second beam 38 passes to a modulated filter 50 which is modulated by an input digital signal 52. The operation of the modulated filter 50 will be described in more detail later.

The modulated filter 50 generates an output beam 54 of photons 56 which passes to an actively quenched photon counting avalanche photodiode 58. A suitable photodiode is described by Brown, Jones, Rarity and Ridley in Applied Optics, Vol 26, pages 2383-2389. The photodiode 58 produces a respective electrical pulse 60 in response to each photon 56 detected. Each electrical pulse 60 passes to a laser diode modulator 62 controlling a laser diode 64. These are standard communications grade components, and in this embodiment the laser diode 64 has an output wavelength of 1.5 $\mu$m.

The laser diode 64 produces a respective optical pulse 66 for each electrical pulse 60. Thus the modulated low light level beam 54 has been converted to a macroscopic light beam 68 in which each laser output pulse 66 corresponds to a respective photon 56. The beam 68 constitutes a timing signal. It passes via a lens 70 to the polarising beam splitter 48.

The polarising beam splitter 48 combines the macroscopic light beam 68 and first low light level beam 36 into a combined beam 72. The combined beam 72 is transmitted through free space to the remote receiver 14 as indicated by a discontinuity 74.

The combined beam 72 enters the receiver 14 through a collimating lens 76. The beam 72 then passes to a dichroic beamsplitter 78 which separates it into a received macroscopic light beam 80 and a received low light level beam 82. The received macroscopic light beam 80 consists of optical pulses 84 of wavelength 1.5 $\mu$m and the received low light level beam 82 consists of photons 86 of wavelength 826 nm. The macroscopic light beam 80 passes to a communications grade detector 88 which produces an electrical pulse 90 for each optical pulse 84. The electrical pulses 90 pass to a multichannel coincidence counter 92, described in more detail later.

The received low light level beam 82 passes to an unmodulated filter 94, matched to the modulated filter 50 in the transmitter. The unmodulated filter 94 will be described in more detail later. It generates first and second output low light level beams 96, 98 of photons indicated by 100, 102 respectively. The beams 96, 98 pass to two actively quenched photon counting avalanche photodiodes 104, 106 respectively. The photodiode 104 produces a respective electrical pulse 108 for each photon 100 detected. Likewise the photodiode 106 produces a respective electrical pulse 110 for each photon 102 detected. The electrical pulses 108, 110 pass to the coincidence counter 92.

Figure 3:
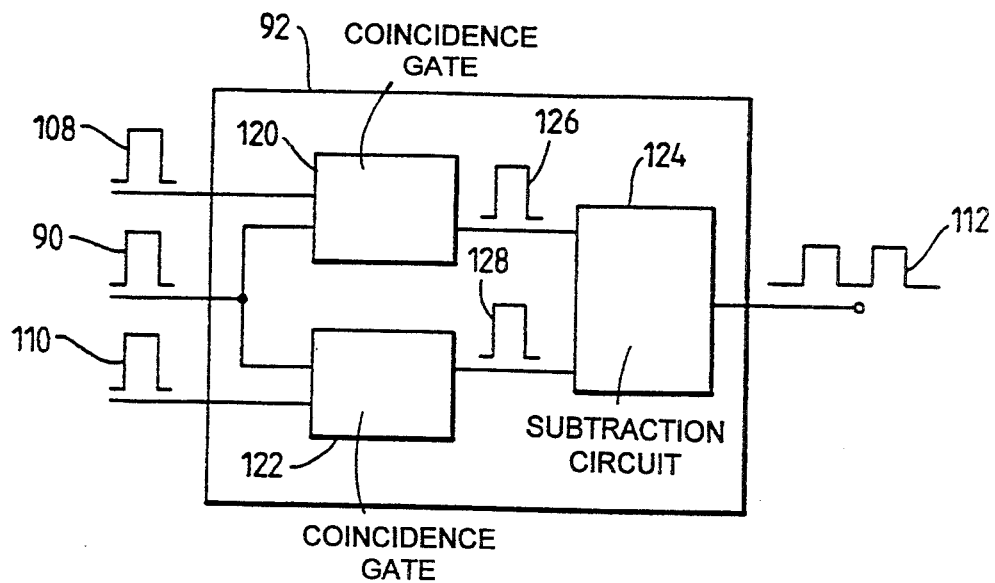
FIG. 3 schematically illustrates a coincidence counter used in the FIG. 1 system.

Referring now to FIG. 3, the coincidence counter 92 is illustrated schematically. The counter 92 includes first and second coincidence gates 120, 122 and a digital subtraction circuit 124. Pulses 90 and 108 enter the first coincidence gate 120 and for each coincidence counted a pulse 126 is output from the gate 120. Periods of high coincidence rate between pulses 90 and 108 indicate a binary zero level in the digital signal 52. Pulses 90 and 110 enter the second coincidence gate 122 and for each coincidence counted a pulse 128 is output from the gate 122. Periods of high coincidence rate between pulses 90 and 110 indicate a binary one level in the digital signal 52. The pulses 126 and 128 pass to the digital subtraction circuit 124. The circuit 124 measures the respective rates of pulses 126 and 128 and subtracts the rate of pulses 126 from the rate of pulses 128. A discrimination level is set at zero, such that when the subtracted coincidence rates are positive a binary one digit is produced, and when the subtracted coincidence rates are negative a binary zero digit is produced. This generates a decoded digital output signal 112.

Figure 4:
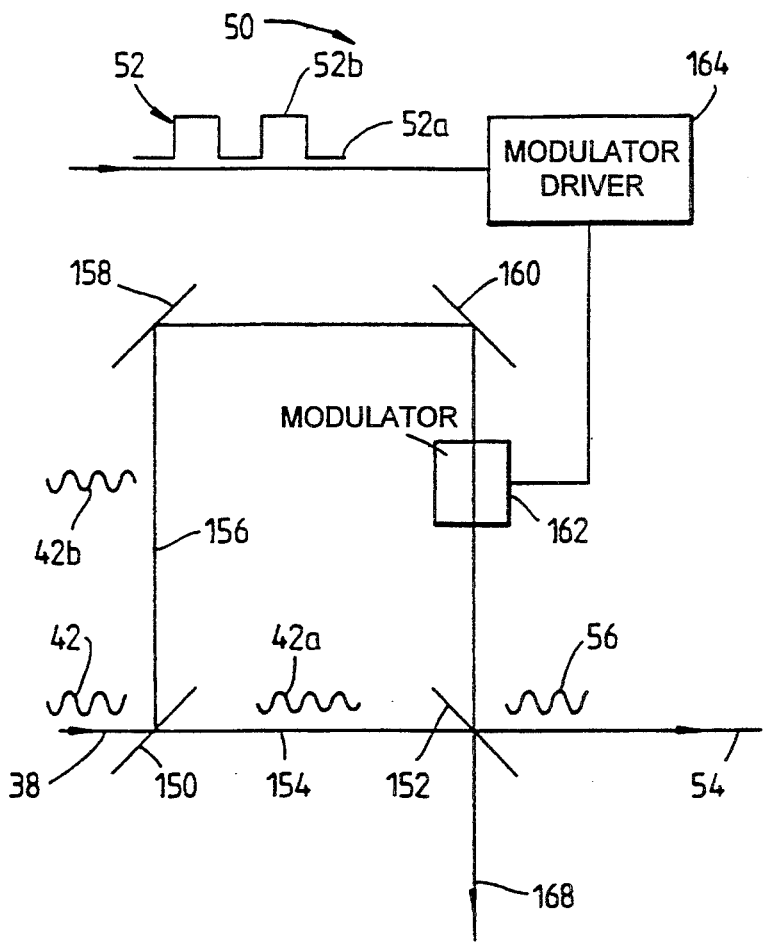
FIG. 4 schematically illustrates a modulated filter used in the FIG. 1 system.

Referring now to FIG. 4, a modulated filter 50 as used in the transmitter 12 is illustrated schematically, parts common to FIG. 1 being like referenced. The modulated filter 50 is Mach-Zehnder (MZ) Interferometer with unequal path lengths. The MZ interferometer 50 has input and output beam splitters 150, 152. A first path 154 through the MZ interferometer 50 is that directly between the beam splitters 150, 152, and is of length $L_1$. A second MZ interferometer path 156 extends to the output beam splitter 152 via two mirrors 158, 160, and is of length $L_2$. The second path 156 is longer than the first by a length $(L_2 - L_1) = P$, the path length difference. The second path 156 incorporates an electro-optic phase modulator 162 activated by a modulator driver 164. The input digital signal 52 is converted by the modulator driver 164 into a control signal for the modulator 162.

The electro-optic modulator 162 is used to alter the optical length $L_2$ of the second path 156. The digital signal 52 has binary 0 and 1 levels 52a and 52b respectively. When it is 0 the second path length remains $L_2$. When the digital signal 52 is 1, the second path length is increased to $L_2 + \delta x$. Thus the path length difference becomes $P + \delta x$.

The photons 42 enter the modulated filter at 38. They are divided into parts 42a and 42b taking paths 154 and 156 respectively. At the output beam splitter 152, each of the parts' 42a and 42b is partially reflected and partially transmitted. In consequence, the modulated low light level beam 54 is the sum of the transmitted component of part 42a and the reflected component of part 42b. A second modulated low light level beam 168 is also formed, by partial reflection of part 42a and partial transmission of 42b. The second beam 168 is however not used in this example. The MZ interferometer 50 acts as a cosinusoidal filter, with first and second output intensity functions $I_1(\omega)$ and $I_2(\omega)$ given by:

$$I_1(\omega) = I_{38}(\omega)[1 + \cos(\omega P/c)]/2 \qquad (4)$$

$$I_2(\omega) = I_{38}(\omega)[1 - \cos(\omega P/c)]/2 \qquad (5)$$

where $I_{38}(\omega)$ is the intensity of beam 38 as a function of angular frequency $\omega$, P is the previously defined path length difference and c is the speed of light. The path length difference P is arranged to be smaller than the coherence length of the laser 18, and larger than the coherence length of the beams 38, 36.

Figure 5:
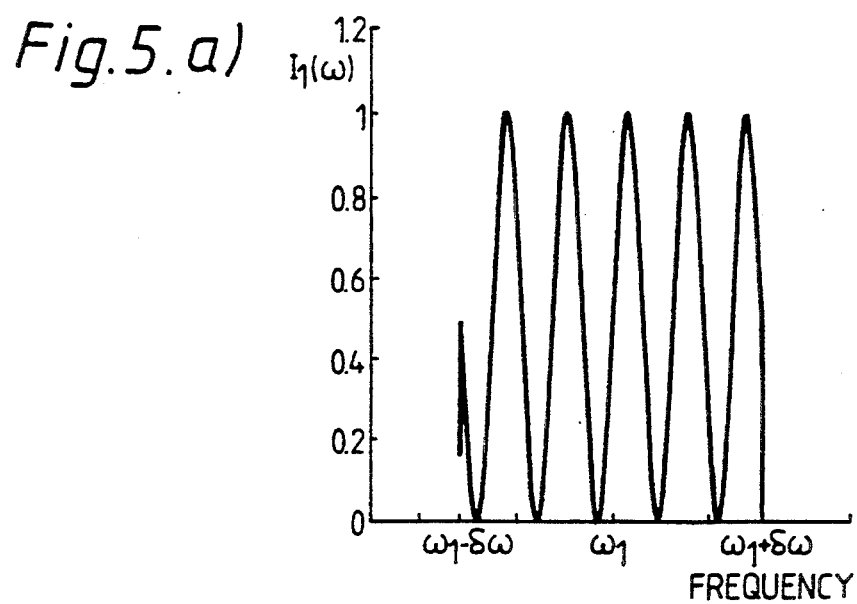
FIG. 5a and 5b graphically illustrate the cosinusoidal transmission characteristics of the modulated filter of FIG. 4.
Figure 5:
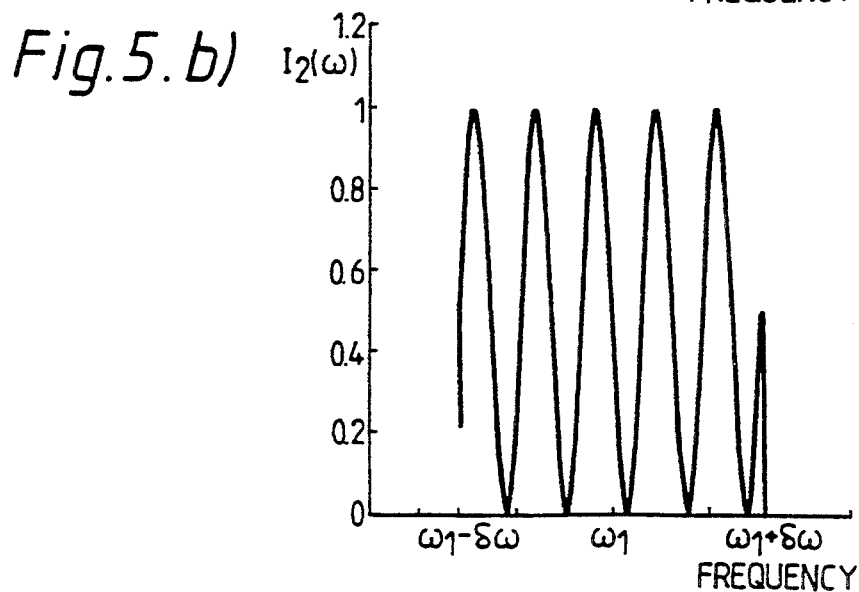

Referring now also to FIG. 5, the transmission characteristics of the modulated filter 50 are illustrated graphically in the form of first and second output intensity functions $I_1(\omega)$ and $I_2(\omega)$. They transmit equal total intensity over the bandwidth $2\delta\omega$, but exhibit conjugate spectral form. In other words, these functions are mirror images of each other about the central frequency $\omega_1$. When the digital signal 52 is binary zero and the path length difference is P, then the beam 54 has the output intensity function given by $I_1(\omega)$, illustrated in FIG. 5a).

The beam 168 has the conjugate spectral output intensity function $I_2(\omega)$ illustrated in FIG. 5b). In practice the intensity functions $I_1(\omega)$ and $I_2(\omega)$ will have many more fringes over the frequency bandwidth $2\delta\omega$ than shown in FIG. 5, typically of the order of 100.

The photons 42 have a frequency band $\omega_1 \pm \delta\omega$ with $\omega_1 >> \delta\omega$ and the change in the length of path 156, $\delta x$ is arranged to be $\delta x = \pi/\omega_1$. Thus when the digital signal 52 is binary 1, and the path length difference is $P+\delta x$, the beam 54 has the output intensity function $I_2(\omega)$ and the beam 168 has the function $I_1(\omega)$. A change in path length of $\delta x$ thus causes an exchange of output intensity functions $I_1(\omega)$ and $I_2(\omega)$ between the beams 54 and 168. Thus the beam 54 carries the digital signal 52 by switching between two alternative states of the transmission characteristics of the modulated filter 50. When the signal 52 is zero, the beam 54 has a frequency spectrum indicated by $I_1(\omega)$; when the signal 52 is one, the beam 54 has a frequency spectrum indicated by $I_2(\omega)$. Provided $P\delta\omega/c >> 1$, the exchange of intensity functions $I_1(\omega)$, $I_2(\omega)$ does not change the mean intensity of beam 54. The condition that $P\delta\omega/c >> 1$ is satisfied when P is larger than the coherence length of the beams, 38, 36.

Figure 6:
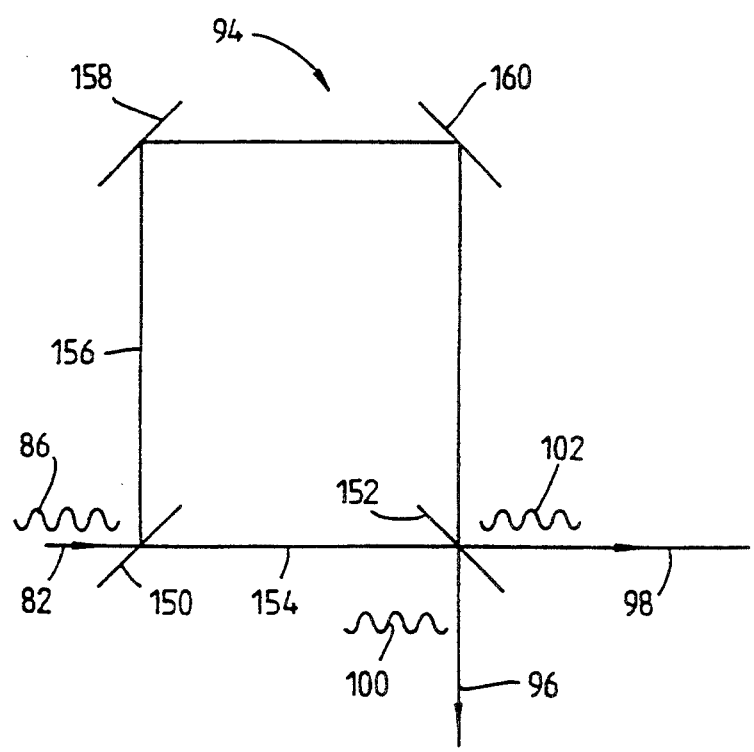
FIG. 6 schematically illustrates an unmodulated filter used in the FIG. 1 system.

Referring now also to FIG. 6, the unmodulated filter 94 used in the receiver 14 is illustrated schematically. Parts common to the modulated filter 50 are like referenced but with the addition of an asterisk. The unmodulated filter 94 is matched to the modulated filter 50 in the absence of communications signal modulation, ie. when it is quiescent. Thus the first path 154* is of length $L_1$ and the second path 156* is of length $L_2$, and the path length difference is given by $(L_2 - L_1) = P$. Since the unmodulated filter 94 is matched to the modulated filter 50 its filter function is also given by equations 4 and 5. Thus the beam 98 has an intensity function $I_1(\omega)$ and the beam 96 has an intensity function $I_2(\omega)$, each over the bandwidth of the pair photons 40, $\omega_1 \mp \delta\omega$. The unmodulated filter 94 acts as a reference filter.

Photon by photon energy matching is required between each correlated photon pair 40, 42. That is if a photon 42 has a particular angular frequency, given by $\omega_a$, within the bandwidth $\omega_1 \mp \delta\omega$ then the correlated photon 40 must have the conjugate angular frequency, given by $\omega_b$, within the bandwidth $\omega_1 \mp \delta\omega$, where $\omega_a + \omega_b = \omega_o$. Thus if a photon 42, with frequency $\omega_a$, passes through the modulated filter 50 when the beam 54 has intensity spectrum $I_1(\omega)$ then the received correlated pair photon 86, with frequency $\omega_b$, will pass through the unmodulated filter 94 into beam 96 which has the conjugate intensity spectrum $I_2(\omega)$. Similarly when a photon 42 passes through the modulated filter 50 when the beam 54 has intensity spectrum $I_2(\omega)$ then the received correlated pair photon 86 will pass through the unmodulated filter 94 into beam 98 which has the conjugate intensity spectrum $I_1(\omega)$. In general the transmission characteristics of the unmodulated filter 94 are conjugate to those of the modulated filter 50 if the transmission characteristics of the unmodulated filter 94 giving rise to either beam 96 or beam 98 (but not both) are conjugate to those of the modulated filter 50 giving rise to beam 54 in the absence of a communications signal 52.

Each transmitter filtered photon 56 gives rise (by virtue of elements 58 to 88) to an electrical pulse 90 passing to the coincidence counter 92. Each received filtered photon 100 in beam 96 results in an electrical pulse 108 passing to the coincidence counter 92. When there is a high coincidence rate between the electrical pulses 90 and 108 this indicates that the transmitter filtered photons 56 had the $I_1(\omega)$ spectral form, and hence that the digital signal 52 is binary 0.

Likewise when the transmitter filtered photons 56 have the $I_2(\omega)$ spectral form, the correlated received photons 86 will have the $I_1(\omega)$ spectral form, and consequently will leave the unmodulated filter 94 in beam 98. The photons 56 result in electrical pulses 90 and the photons 102 in beam 98 result in electrical pulses 110. The pulses 90 and 110 pass to the coincidence counter 94. When there is a high coincidence rate between the pulses 90 and 110 this indicates that the transmitter filtered photons 56 had the $I_2(\omega)$ spectral form, and hence that the digital signal 52 is binary 1.

Figure 7:
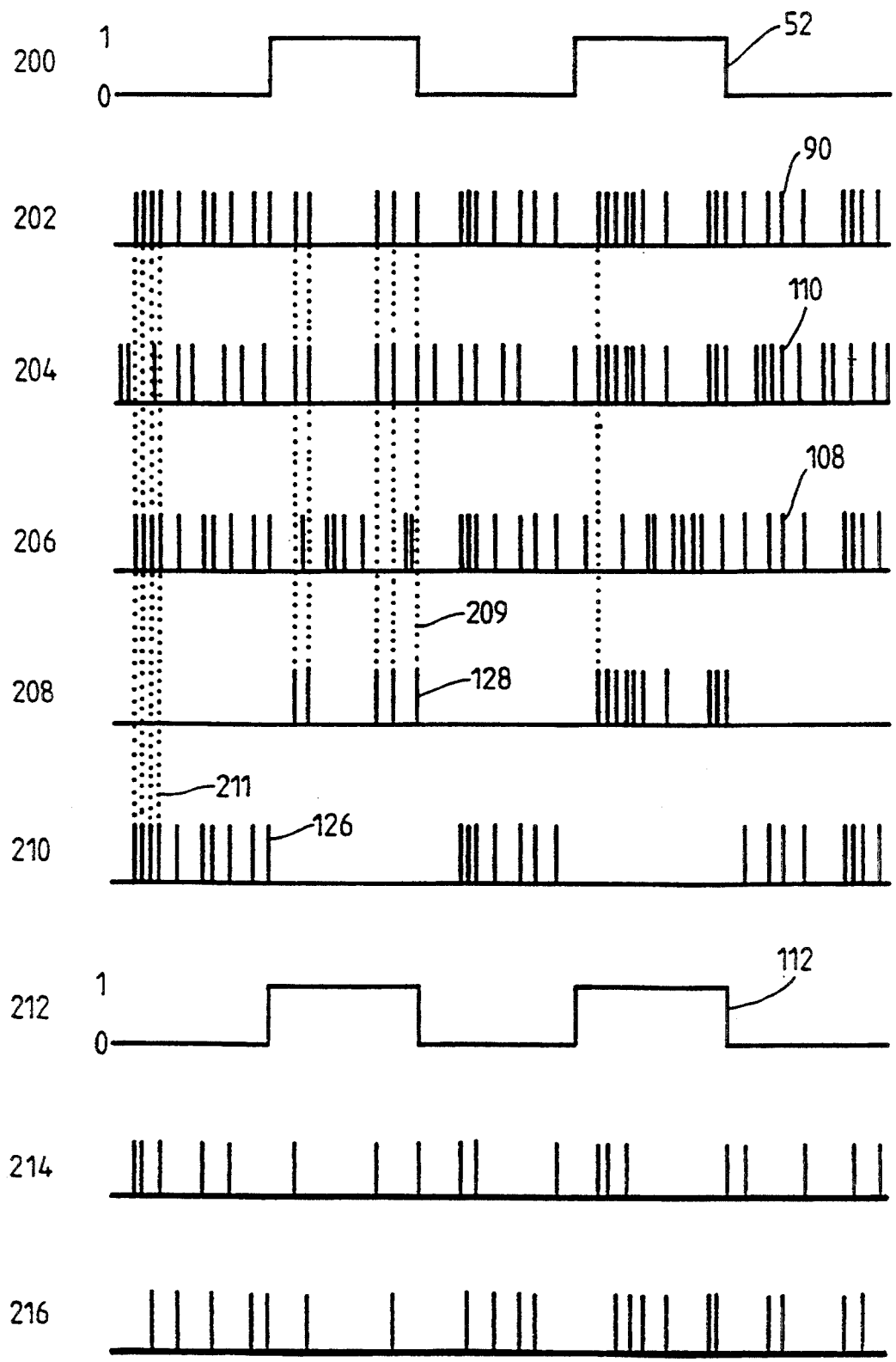
FIG. 7 illustrates graphically the relative timing of operation of the communications system of FIG. 1.

Referring now to FIG. 7, a timing diagram for the system 10 is given. Amplitude is plotted against time in a series of graphs 200 to 216. The binary digital signal 52 to be transmitted is illustrated in the first graph 200. Graphs 202 to 210, and 214 and 216 show discrete electrical pulses as vertical lines. The second, third and fourth graphs 202-206 indicate the timing of photodetection pulses 90, 110 and 108 respectively input to the coincidence counter 92. The fifth graph 208 illustrates electrical pulses produced within the coincidence counter 92 on the occurrence of a coincidence between a pulse 90 and a pulse 110; the first six of these coincidences are indicated by dotted lines such as 209 extending from graph 204 to graph 208. Similarly the sixth graph 210 illustrates electrical pulses produced within the coincidence counter 92 on the occurrence of a coincidence between a pulse 90 and a pulse 108; the first four of these coincidences are indicated by dotted lines such as 211 extending from graph 202, through graph 206 to graph 210. Periods of high coincidence rate between electrical pulses 90 and 110 correspond to the signal 52 being the binary digit one. Similarly periods of high coincidence rate between electrical pulses 90 and 108 correspond to the signal 52 being the binary digit zero. Thus the output decoded digital signal 112 is obtained from subtraction of one of these coincidence rates from the other. The output decoded digital signal 112 is illustrated in graph 212.

If the unmodulated filter 94 is characterised by a path length difference P', different to that (P) of the modulated filter 50 then the filter characteristics are changed. If the difference (P−P') is shorter than the coherence length of the downconverted photons 40, 42, that is $|(P-P')\delta\omega| << 2\pi$, the change over the bandwidth is small and there is negligible loss of signal 52. With difference (P−P') larger than the coherence length, that is $|(P-P')\delta\omega| >> 2\pi$, the filters 50 and 94 move in and out of phase many times over the full optical bandwidth $2\delta\omega$ and the signal 52 is lost. This situation is illustrated in the eighth and ninth graphs 214, 216 of FIG. 6, in which vertical lines represent electrical pulses produced in the coincidence counter 92 on the occurrence of coincidences between pulses 90 and 110 and between 90 and 108 respectively. Clearly there is no pattern to the coincidences counted. Coherence lengths of the correlated photon beams 36, 38 are small, typically less than 100 $\mu$m. In consequence, it is important to match the pathlength differences P and P' in the filters 50 and 94.

The system may support a signal of particular bandwidth, this bandwidth being dependent on the coincidence rate $C_o$ practically achievable given the losses in transmission. Signal loss in the macroscopic pulse path may be made negligible since gain may be used. Therefore assuming no loss of pulses in the macroscopic pulse path we may write, $$C_o = \eta_T \eta_R \eta_{tr} r \quad (6)$$

where $\eta_T$ and $\eta_R$ are quantum efficiencies of collection and detection in the transmitter and receiver photon counting detectors 58, 104, 106 respectively, $\eta_{tr}$ is a lumped transmission efficiency through the low light level beam 36, 82, and r is the initial pair photon rate at the crystal 20. To maximise signal the coincidence rates between pulses 90 and 108, and 90 and 110, which are in antiphase, are both measured and subtracted. If the modulator 162 is arranged to introduce a $\pi$ phase difference then a difference coincidence rate modulation of $C_o/2$ between binary 1 and binary 0 bits is ensured. If, for instance, we require 10 difference coincidences per bit, have $\eta_T = \eta_R = 10\%$, $\eta_{tr} = 10\%$ and a maximum baud rate of 10,000 bits per second, then a correlated pair photon rate of $r = 2 \times 10^8$ s$^{-1}$ would be required. The accidental coincidence rate, B, neglecting background light and detector dark count, is given by $$B = \eta_T \eta_R \eta_{tr} r^2 t \quad (7)$$

where t is the coincidence gate width, defined as the maximum delay between the start of the first pulse and the start of the second pulse for which a coincidence will be recorded. For negligible accidental coincidence rate $B < C_o$ we require $rt < 1$ or, for the above example, $t < 5$ ns.

An alternative embodiment of the system 10 (not illustrated) may be constructed in which the low light level beam 36 and the macroscopic beam 68 are not combined for transmission. In this embodiment the polarising beam splitter 48 and dichroic beamsplitter 78 are omitted and a second focussing lens is required at the input to the receiver 14. The macroscopic beam 68 enters the receiver 14 via the first focussing lens 76. The low light level beam 36 enters the receiver 14 via the second focussing lens, and passes to the unmodulated filter 94. The system operates in an identical manner to the system 10.

A further embodiment (not illustrated) involves the use of the second output beam 168 from the modulated filter 50. The second output beam 168 is handled similarly to the first output beam 54, is transmitted as a second macroscopic beam and results in a second series of pulses similar to the pulses 90 but in antiphase to them. The second series of pulses enters the coincidence counter 92 and its coincidences with the pulses 108 and 110 are counted. A high coincidence rate between the second series of pulses and pulses 108 corresponds to the digital signal 52 being binary 1. Similarly a high coincidence rate between the second series of pulses and pulses 110 corresponds to the digital signal 52 being binary 0. The use of the second output beam 168 does not provide any additional information since the information it carries is the conjugate of that carried by the first output beam 54. It does, however, increase the signal to noise ratio of the system, thus enabling the latter to be used over greater distances or in less favourable conditions.

Another alternative embodiment of the communications system 10 (not illustrated) may be constructed to be frequency agile. That is the filters 50 and 94 may periodically be switched to different matched characteristics, by alteration of the path length difference P. Thus for processing of each correlated photon pair the filters 50 and 94 are matched, and switching occurs between one pair and the next. This arrangement corresponds to imposing a like modulation on the optical transmission characteristics of the filters 50 and 94, the modulation leaving unaffected the signal detected by the coincidence counting technique. The criterion for correct operation is that, when the receiver 14 receives a photon 86 the unmodulated filter must be matched to the modulated filter 50, in the terms defined previously, at the time the correlated pair photon 42 was filtered. The transmission characteristics of the unmodulated filter 94 may therefore vary so long as for each correlated photon pair they remain matched to those of the modulated filter 50.

Frequency agility may be arranged by inserting electro-optic modulators into the first paths 154 and 154' through the filters 50 and 94 respectively. If the modulators are like activated and of like type then the same change in effective path length will occur in the filter 50 and 94. Thus the filters 50, 94 will have changed to different matched characteristics. Such changes may be arranged to occur in response to a code inserted into the signal 52 or at prearranged intervals.

The embodiments previously described have alternative components. The following alternatives are given as examples. The laser 18 and non-linear crystal 20 may be replaced by a cascade atomic source. A suitable calcium cascade atomic source is described by Freedman and Clauser in Physical Review Letters, Vol. 28 page 939. It produces pairs of photons with wavelengths $\lambda_1 = 551.3$ nm and $\lambda_2 = 422.7$ nm. The matched MZ interferometers in the filters 50 and 94 may be replaced by tunable monochromators or rotatable interference filters with narrow passbands. Transmission of light beams 72, or 36 and 68 or 36, 68 and the second macroscopic beam, between the transmitter 12 and receiver 14 may be along optical fibres with appropriate coupling lenses.

A further possible alternative is in the wavelengths of light used and the consequent light beam handling. The system 10 has the low light level beam 36 and macroscopic beam 68 at sufficiently different wavelengths that they may be split in the receiver 14 by means of a dichroic beamsplitter 78. The system 10 may also be constructed such that the beams 36 and 68 have the same wavelength and are split in the receiver 14 by means of a polarising beam splitter. In the example given this may be achieved by replacing the laser diode 64 by one of wavelength 830 nm. The wavelengths of the beams 36 and 38 may also be altered by changing the positions of the apertures 32, 34 and thus the proton energies selected.

The embodiments of the invention described thus far have been capable of handling digital signals. Embodiments of the invention may also be constructed to be capable of handling analogue signals.

Figure 8:
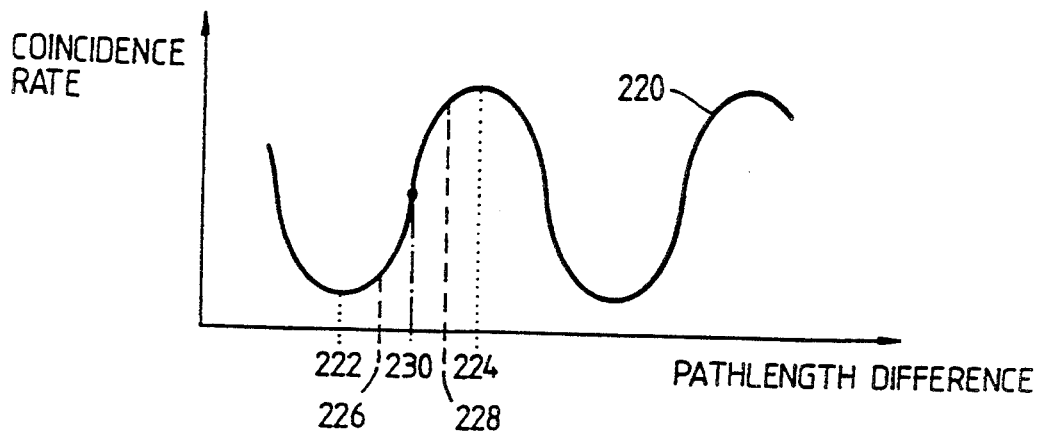
FIG. 8 graphically illustrates the variation of coincidence rate with path length difference.

Referring now to FIG. 8, the variation of coincidence rate between pulses 90 and pulses 108 with path length difference is illustrated graphically by curve 220. The variation is sinusoidal. In the system 10, transmitting a digital signal 52, the path length difference is varied by the modulator 162 between the points 222 and 224. The point 224 represents the unmodulated path length difference P of the modulated filter 50, and thus is the path length difference when the digital signal 52 is binary 0. The point 222 represents the modulated path length difference P+δx of the modulated filter 50, and is the path length difference when the digital signal 52 is binary 1. The coincidence rate thus switches between maximum and minimum as the signal level alters.

For transmission of an analogue signal a system is designed to operate within a ¼ period as bounded by points 226 and 228. The path length difference will vary with the variations in analogue signal level, within the bounds indicated. Point 230 in the centre of the ¼ period 226 and 228 is the unmodulated path length difference P in this system, and results in equal and constant coincident rates in the two coincidence gates 120, 122. An analogue signal applied to the modulator 162 will vary the path length difference continuously within the bounds, and thus modulate the coincidence rates at gates 120, 122. The digital circuit 124 is replaced in this embodiment by a suitable analogue subtraction circuit which generates a decoded analogue signal.

Foregoing embodiments of the invention have employed a number of photon pairs to convey a bit of information. They may, however, be operated in such a way that a bit is conveyed by a single photon pair. For instance the system 10 may be operated with each bit conveyed by a single photon pair 40, 42. Thus a single coincidence between pulse 90 and 108 would represent a binary 0, and between pulse 90 and 110 would represent a binary 1. Clearly any losses during transmission would result in lost bits. However, such losses will, in most cases, be of photon 40 in the low light level channel. In such circumstances the associated timing pulse 84 will still be received but will not have a coincident photon 100 or 102. The individual receiving the transmission will therefore be aware of the lost bit and can communicate the loss of the bit with that timing to the individual transmitting. This communication maybe by conventional means since the content of the bit or bits is not sent. The lost bit or bits may then be retransmitted. Alternatively the entire transmission may be repeated, since it is unlikely that the same bits will be lost again, the entire message may then be constructed from two or more received transmissions. This entire process may be automated by the addition of appropriate circuitry to the system 10.

However, if the purpose of the original transmission was to share a cryptographic key retransmission is not necessary. That is, once the individual receiving the transmission has informed the individual transmitting it which bits have been received, they are both aware of which bits they both have knowledge of. The original transmission must include sufficient excess bits for sufficient to have been successfully received to form the cryptographic key. The cryptographic key is then based only on those bits successfully transmitted. Those bits not received are simply discarded by the individual transmitting the bits.

Strictly speaking for communication to take place with one photon pair per bit the following criteria should be met. The modulation of the transmitter filter 50 should be such that it produces one hundred per cent modulation of the photons output from the receiver filter 94. That is the modulation must correspond to switching between maximum and minimum coincidence rates as illustrated by points 222 and 224 in FIG. 8. For the minimum coincidence rate to be zero the time resolution of the detectors 58, 88, 104, 106 and the coincidence counter 262 must be shorter than the time taken for a photon to travel a distance corresponding to the pathlength difference of the MZ inferferometers 50, 94.

In reality, however, imperfections in the system will prevent one hundred per cent visibility of the modulation and thus errors will occur. Repeat transmission will reduce errors to the level where error correction codes can be used to compensate for the errors.

Due to the above criteria not all filtering means are suitable for use in one photon pair per bit communication systems. An example of a suitable filter is the Mach Zehnder interferometer.

Figure 9:
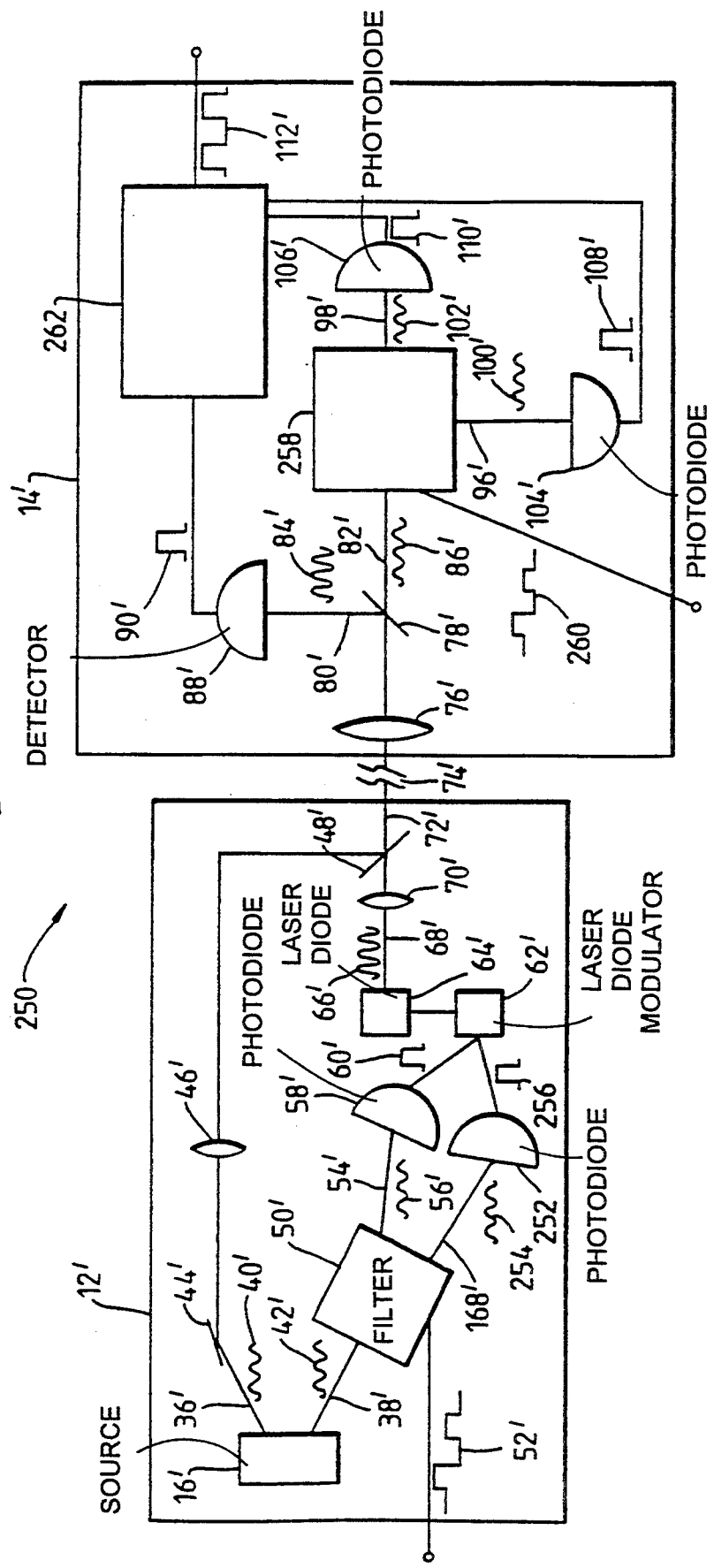
FIG. 9 schematically illustrates an alternative optical communications system of the invention.

Referring now to FIG. 9 a further optical communications system 250 of the invention is illustrated schematically. The system 250 employs one photon pair per bit and is suitable for the transmission of a cryptographic key, but not for the transmission of data known prior to transmission. It also includes a method by which eavesdroppers may be detected. Parts common to the system 10 are like referenced but with the addition of a prime superscript. The majority of the parts of the system 250 are common with the system 10, however there are some differences which will now be described.

The transmitter modulated filter 50' has two outputs 54' and 168' The output 54' passes to a photodiode 58' which detects each incident photon 56' and outputs a corresponding electrical pulse 60'. Output 168' passes to photodiode 252 which detects each incident photon 254 and outputs a corresponding electrical pulse 256. The electrical pulses 60' and 256 are both input to the laser diode modulator 62' which controls the laser diode 64'. The laser diode 64' outputs an optical pulse 66' corresponding to each pulse 60' and each pulse 256. Thus for each photon 56' and each photon 254 an optical pulse 66' is generated.

The receiver 14' includes a modulated filter 258 in place of an unmodulated filter. The modulated filter 258 is similar to the modulated filter 50'. It is modulated by an input digital signal 260. The receiver 14' also includes a multichannel coincidence counter 262 which operates somewhat differently to the coincidence counter 92.

The optical communications system 250 operates as follows. In many respects the system 250 operates in a similar manner to the system 10, and these aspects are not described again. Those aspects of the operation of the system 250 that differ from that of the system 10 are described below.

The transmitter input digital signal 52' is randomly varying between three voltage levels. These voltage levels produce three different transmitter filter phase differences, referred to collectively as $\phi_5$, these being:

$$\phi_{t1}=0, \phi_{t2}=\pi/4 \text{ and } \phi_{t3}=\pi/2.$$

Each photon 42' is filtered according to the phase difference $\phi_{t1}$, $\phi_{t2}$ or $\phi_{t3}$ active at the respective time, and emerges into beam 54' or 168' as photon 56' or 254 as appropriate. The photons 56' and 254 are detected as described above and light pulses 66' generated as timing signals. That is each pulse 66' represents the timing of a photon 56' or 254. This follows through to the receiver 14' where each electrical pulse 90' represents the timing of a photon 56' or 254.

The Transmitter must keep a record of all photons 56' and 254 with their timings, for later use.

The receiver digital input signal 260 also varies randomly between three voltage levels. The three voltage levels produce three different receiver filter phase differences, referred to collectively as $\phi_r$, these being:

$\phi_{r1} = -\pi/4$, $\phi_{r2} = 0$ and $\phi_{r3} = \pi/4$.

Each photon 86' is filtered according to the phase difference $\phi_{r1}$, $\phi_{r2}$ or $\phi_{r3}$ active at the respective time, and emerges into beam 96' or 98', as photon 100' or 102' as appropriate. The photons 100' and 102' are detected and corresponding electrical pulses 108' and 110' respectively generated.

The electrical pulses 90', 108' and 110' pass to the coincidence counter 262. Coincidences between pulses 90' and 108' and between pulses 90' and 110' are recorded.

Pulses 90' represent both photons 56' and 254. Thus coincidences between pulses 90' and 108' represent coincidences between photons 56' and 100' and between photons 254 and 100'. Likewise coincidences between pulses 90' and 110' represent coincidences between photons 56' and 102' and between photons 254 and 102'. In an ideal apparatus, ie with no losses due to inefficient detectors etc, the probability of coincidences between any two photons is given by $$P(56'-100') = P(254-102') = \tfrac{1}{4}(1+\cos(\phi_t+\phi_r)), \quad (8a)$$

$$P(56'-102') = P(254-100') = \tfrac{1}{4}(1-\cos(\phi_t+\phi_r)), \quad (8b)$$

and where $\phi_t$ can take the value $\phi_{t1}$, $\phi_{t2}$ or $\phi_{t3}$ and $\phi_r$ can take the value $\phi_{r1}$, $\phi_{r2}$ or $\phi_{r3}$.

A correlation coefficient E can be formulated from these probabilities:

$$E(\phi_t,\phi_r) = P(56'-100') + P(254-102') - P(56'-102') - P(254-100') = \cos(\phi_t+\phi_r), \quad (9)$$

where $\phi_t$ and $\phi_r$ can take values as above. When the correlation coefficient, $E = -1$ the Transmitter and Receiver are able to share information.

For simplicity of description the individual transmitting the bits will be referred to as the Transmitter, whilst the individual receiving will be referred to as the Receiver.

In order to interpret the coincidences recorded the Transmitter and Receiver have to exchange further information. This can be carried out over normal communications channels. Firstly they must inform each other of the durations over which the various phase differences were active. This may be done by exchanging the respective input digital signals 52' and 260. In addition the Receiver must inform the Transmitter of the timing of observed coincidences, but not including which photons were coincident.

Thus the Transmitter and Receiver each know, a) the timings of coincidences observed in the coincidence counter 262, b) both phase differences $\phi_t$ and $\phi_r$, active at the time of each coincidence, and c) from which channel of their respective filter 50' or 258 the appropriate photon originated. They do not know which channel of the other filter 258 or 50' respectively the other coincident photon originated from.

There are nine possible combinations of values of $\phi_t$ and $\phi_r$, these being listed in Table 1 below:

There are therefore two combinations, numbers 2 and 4 in Table 1 above, when $\phi_t+\phi_r=0$ and thus $E = -1$. So for durations when these combinations are active information is shared by the Transmitter and Receiver. All coincidences during these periods represent either a binary zero or a binary one, according to a convention established prior to transmission. For instance if a photon 56' is involved in the coincidence the coincidence represents binary zero, whilst a coincidence involving a photon 254 represents a binary one. Likewise, but from the Receivers point of view, if a photon 100' is involved the coincidence represents a binary zero and if it involves a photon 102' it represents a binary zero.

Thus a series of random bits 112' has been established such that which is known to both the Transmitter and Receiver, and which may be used as a cryptographic key.

The system 250 is arranged such that eavesdroppers may be detected and this aspect is described below. As has already been stated, when the combination of phase differences is such that $\phi_t+\phi_r=0$ information can be shared by the Transmitter and the Receiver. When the combination of phase differences is such that $\phi_t+\phi_r\neq 0$ the filters 50' and 258 are not fully correlated and information, in the form of binary bits, cannot be shared. However the coincidences recorded when $\phi_t+\phi_r\neq 0$ can be statistically analysed in order to detect eavesdroppers. This is done using Bell's Inequality. When pair photon wavefunctions are quantum mechanically entangled, as the pairs are if not intercepted by an eavesdropper, then the function $$S(\phi_t,\phi_r) = E(\phi_{t1},\phi_{r1}) + E(\phi_{t1},\phi_{r3}) + E(\phi_{t3},\phi_{r1}) + E(\phi_{t3},\phi_{r3}) \quad (10)$$

has the value $2\sqrt{2}$. However, if a photon is intercepted, measured, and a facsimile of it retransmitted then the quantum mechanical entanglement is broken. In this case it has been proved by J S Bell (Physics (N.Y.)1, 195, (1965)), that the value of the function S is always less than 2. Thus if the function S is calculated at the end of a transmission it may be established whether the transmission was intercepted by an eavesdropper or not.

All of the embodiments of the invention described are secure even when all light beams transmitted are intercepted. Looking at the system 10 in detail, one light beam 72 is transmitted. The beam 72 consists of photons 40 of wavelength $826.8 \pm 5$ nm and macroscopic optical pulses 66 of wavelength 1.5 μm. Each pulse 66 has a coincident photon 40, but the reverse is not true. Those photons 40 without coincident pulses 66 are spread throughout the photon bandwidth. Some of the pulses 66 represent binary zero and some represent binary one. The only way in which to decode the signal 52 carried by these pulses 66 is to put the photons 40 through a filter matched to the filter 50 in the transmitter 12. Thus if the combined beam 72 is intercepted, it may be broken down into its component parts relatively simply but may not be decoded. Even detailed timing or spectral analysis of the photons 40 and pulses 66 will not reveal the signal 52. Since the signal 52 is carried in the same

TABLE 1

| Combination | 1 | 2 | 3 | 4 | 5 | 6 | 7 | 8 | 9 |
|---|---|---|---|---|---|---|---|---|---|
| $\phi_t$ | 0 | 0 | 0 | $\pi/4$ | $\pi/4$ | $\pi/4$ | $\pi/2$ | $\pi/2$ | $\pi/2$ |
| $\phi_r$ | $-\pi/4$ | 0 | $\pi/4$ | $-\pi/4$ | 0 | $\pi/4$ | $-\pi/4$ | 0 | $\pi/4$ |

We claim:

1. An optical communications system comprising:
a transmitter including a source of correlated pairs of photons with conjugate energies in first and second photon beam channels respectively, and
a receiver including
coincidence counting means for counting coincidences between received photons,
said coincidence counting means including discriminating means responsive to variation in coincidence counting rate for providing a communications signal,
wherein
the transmitter includes:
(a) transmitter filtering means in the first photon beam channel having modulatable spectral dispersion characteristics responsive to a transmitter signal input, and
(b) means responsive to the transmitter filtering means output, for transmitting a timing signal, and
the receiver includes receiver filtering means having spectral dispersion characteristics conjugate to those of the transmitter filtering means in the absence of signal input for separating received photons into differing receiver channels on the basis of their spectral characteristics, the coincidence counting means responsive to the timing signal and photons from at least one of the receiver channels.

2. A system according to claim 1 characterised in that:
(a) the receiver filtering means has two filter channels one of which has the said spectral dispersion characteristics and the other of which has spectral dispersion characteristics spectrally conjugate thereto, the receiver filtering means being arranged to provide two separate photon beams with conjugate spectra, and
(b) the coincidence counting means is arranged for separate counting of coincidence rates between the two conjugate spectrum beams and the timing signal.

3. A system according to claim 2 characterised in that it is arranged to transmit digital binary signals, and
(a) includes means for switching the transmitter filtering means between two conjugate spectral dispersion characteristics in response to the digital signal, and
b) the receiver discriminating means is responsive to variation in two coincidence counting rates corresponding to respective conjugate spectrum beams and is arranged to subtract one such rate from the other to provide a communications signal.

4. A system according to claim 2 characterised in that:
(a) it is arranged for communication of one bit per photon pair, and
(b) the transmitter and receiver filtering means are arranged such that appropriate modulation of the transmitter filtering means produces substantially one hundred per cent modulation of the two coincidence rates.

5. A system according to claim 4 characterised in that:
(a) the transmitter filtering means has two filter channels,
(b) the receiver filtering means has modulatable spectral dispersion characteristics responsive to a receiver signal input, and
(c) the transmitter and receiver filtering means are each arranged for modulation between at least three respective predetermined phase differences in response to random transmitter or receiver input signals respectively, at least one combination of transmitter and receiver phase differences providing substantially one hundred per cent modulation of the two coincidence rates.

6. A system according to claim 4 characterised in that both the transmitter and receiver filtering means are Mach Zehnder interferometers each with an electro-optic modulator in one arm.

7. A system according to claim 1 characterised in that
(a) the transmitter filtering means is a Mach Zehnder interferometer incorporating an electro-optic modulator in one arm, and
(b) the receiver filtering means is a Mach Zehnder interferometer with optical path lengths equal to corresponding path lengths in the transmitter filtering means when the modulator is inactive.

8. A system according to claim 1 characterised in that it includes means for combining the timing signal and second transmitter channel photon beam for transmission as a single beam.

9. A system according to claim 1 characterised in that it includes means for transmitting the timing signal and second transmitter channel photon beam from the transmitter to the receiver through free space.

10. A system according to claim 1 characterised in that it includes one or more optical fibres for transmitting the timing signal and second photon beam from the transmitter to the receiver.

11. A system according to claim 1 characterised in that the source of correlated photon pairs comprises a pump laser, a non-linear crystal and two appropriately positioned apertures.

12. A system according to claim 1 characterised in that the source of correlated photon pairs is a cascade atomic source.

13. An optical communications system comprising a transmitter and a receiver, wherein said transmitter comprises:
first and second photon beam channels;
a source of correlated pairs of photons with conjugate energies in said first and second beam channels;
said first photon beam channel including a transmitter filtering and photon detecting means for providing a timing signal in response to a received photon, said transmitter filtering and photon detecting means responsive to an input signal; and
means for combining a photon in said second photon beam channel with said timing signal for transmission as an output to said receiver;
and said receiver comprising:
first and second receiving channels;
means, responsive to said transmitted output, for splitting said output into said first and second receiving channels;
first and second photon detecting means for providing a photon signal in response to a detected photon;

receiving filtering means in said second receiving channel, said receiving filtering means having spectral dispersion characteristics conjugate to said transmitter filtering means for separating photons in said second receiving channel between said first and second photon detecting means on the basis of the spectral characteristics of the detected photon;

timing signal detecting means in said first receiving channel for detecting said timing signal and for providing an output signal in response to a detected timing signal; and said coincidence counting means, responsive to said output signal and said photon signal, for providing a receiver output.

14. An optical communications system comprising:
(A) a transmitter including:
a source of correlated pairs of photons with conjugate energies,
first and second photon beam channels for traversal by respective photons of each pair produced by the source,
transmitter filtering means in the first photon beam channel having modulatable spectral dispersion characteristics responsive to a transmitter signal input, and
means for providing timing signals in response to photons output by the transmitter filtering means; and
(B) a receiver including:
a photon beam channel;
receiver filtering means in the photon beam channel having spectral dispersion characteristics conjugate to those of the transmitter filtering means in the absence of said transmitter signal input for separating received photons into differing receiver channels on the basis of their spectral characteristics,
detecting means in the receiver channels for providing photon detection signals in response to received photons,
coincidence counting means, responsive to said timing signals and said photon detection signals for counting coincidences between said timing signals and said photon detection signals, and including discriminating means responsive to variations in coincidence counting rate for providing a communications signal.

15. An optical communications systems according to claim 14, wherein the receiver filtering means has two filter channels, one filter channel has said spectral dispersion characteristics and the other filter channel has spectral dispersion characteristics spectrally conjugate to said one filter channel, the receiver filtering means comprising means for providing two separate photon beams with conjugate spectra, and the coincidence counting means provides separate counting of coincidence rates between the two conjugate spectrum beams and the timing signal.

16. An optical communications system according to claim 15 for transmitting digital binary signals and including switching means for switching the transmitter filtering means between two conjugate spectral dispersion characteristics in response to the transmitter signal input, and wherein the receiver discriminating means is responsive to variation in two coincidence counting rates corresponding to respective conjugate spectrum beams and the discriminating means subtracts one such rate from the other to provide said communication signal.

17. An optical communications system according to claim 15 for communication of one bit per photon pair and wherein appropriate modulation of the transmitter filtering means produces substantially one hundred per cent modulation of the two coincidence rates at the receiver.

18. An optical communications system according to claim 17, wherein the transmitter filtering means has two filter channels, the receiver filtering means has modulatable spectral dispersion characteristics responsive to a receiver signal input, and the transmitter and receiver filtering means are each modulatable between at least three respective predetermined phase differences in response to random transmitter and receiver input signals, respectively, at least one combination of transmitter and receiver phase differences providing substantially one hundred per cent modification of the two coincidence rates.

19. An optical communications system according to claim 17, wherein both the transmitter and receiver filtering means are Mach Zehnder interferometers, each interferometer having an electro-optic modulator in one arm.

20. An optical communications system according to claim 14, wherein the system includes means for combining the timing signal and second transmitter channel photon beam and for transmitting said combined timing signal and photon beam as a single beam.

21. An optical communications system according to claim 14, wherein the transmitter filtering means is a Mach Zehnder interferometer incorporating an electro-optic modulator in one arm and the receiver filtering means is a Mach Zehnder interferometer with optical path lengths equal to corresponding path lengths in the transmitter filtering means when the modulator is inactive.

22. An optical communications system according to claim 14, wherein the system includes means for transmitting the timing signal and second transmitter channel photon beam from the transmitter to the receiver through free space.

23. An optical communications system according to claim 14, wherein the system includes at least one optical fiber for transmitting the timing signal and the second photon beam from the transmitter to the receiver.

24. An optical communications system according to claim 14, wherein the source of correlated photon pairs comprises a pump laser, a non-linear crystal and two appropriately positioned apertures.

25. An optical communications system according to claim 14, wherein the source of correlated photon pairs is a cascade atomic source.

26. An optical communications system comprising:
a transmitter for transmitting photons and a timing signal and including a source of correlated pairs of photons with conjugate energies in first and second photon beam channels respectively, and
a receiver for receiving said photons and said timing signal and including coincidence counting means for counting coincidences between received photons and said timing signal, said coincidence counting means including discriminating means responsive to variation in coincidence counting rate for providing a communications signal, wherein the transmitter includes:

(a) transmitter filtering means in the first photon beam channel for providing an output and having modulatable spectral dispersion characteristics responsive to a transmitter signal input, (b) means responsive to said output of said transmitter filtering means for transmitting said timing signal to said receiver, and (c) means in said second photon beam channel for transmitting said photons to said receiver; and wherein the receiver includes a photon channel, means for receiving said timing signal, means in said photon channel for receiving said photons, receiver filtering means in said photon channel having spectral dispersion characteristics conjugate to those of the transmitter filtering means in the absence of signal input for separating received photons into differing receiver channels on the basis of their spectral characteristics, and detection means in each receiver channel for detecting received photons and for providing a photon signal in response to each detected photon, the coincidence counting means being responsive to the timing signal and to photon signals from at least one of said detection means.

27. An optical communications system comprising:
(A) a transmitter including:
a source of correlated pairs of photons with conjugate energies, first and second photon beam channels for traversal by respective photons of each pair produced by the source, transmitter filtering means in the first photon beam channel having modulatable spectral dispersion characteristics responsive to a transmitter signal input, means for providing timing signals in response to photons output by the transmitter filtering means and for transmitting said timing signals, and means in the second photon channel for transmitting said photons of each pair; and (B) a receiver including:
a photon beam channel;
means for receiving said timing signal,
means for receiving said transmitted photons and for coupling them to said photon beam channel;
receiver filtering means in the photon beam channel having spectral dispersion characteristics conjugate to those of the transmitter filtering means in the absence of said transmitter signal input for separating received photons into differing receiver channels on the basis of their spectral characteristics, detecting means in the receiver channels for providing photon detection signals in response to received photons, and coincidence counting means for counting coincidences between said timing signals and said photon detection signals, and including discriminating means responsive to variations in coincidence counting rate for providing a communications signal.

* * * * *